United States Patent
Forbes et al.

[19]

[11] Patent Number: 6,021,056
[45] Date of Patent: Feb. 1, 2000

[54] INVERTING CHARGE PUMP

[75] Inventors: Andrew Bruce Forbes, Somerville; James Francis Imbornone, Tewksbury; Raymond Thomas Pavio, Lexington, all of Mass.

[73] Assignee: The Whitaker Corporation, Wilmington, Del.

[21] Appl. No.: 09/211,587

[22] Filed: Dec. 14, 1998

[51] Int. Cl.[7] .................................................. H02M 3/18
[52] U.S. Cl. ............................... 363/60; 363/62; 327/536
[58] Field of Search ................... 363/60, 61, 59, 363/62; 327/536, 540, 259

[56] References Cited

U.S. PATENT DOCUMENTS

| | | | |
|---|---|---|---|
| 4,636,930 | 1/1987 | Bingham et al. | 363/60 |
| 4,679,134 | 7/1987 | Bingham et al. | 363/61 |
| 4,807,104 | 2/1989 | Floyd et al. | 363/59 |
| 5,008,799 | 4/1991 | Montalvo | 363/60 |
| 5,262,934 | 11/1993 | Price | 363/60 |
| 5,422,529 | 6/1995 | Lee | 327/536 |
| 5,493,249 | 2/1996 | Manning | 327/540 |
| 5,493,486 | 2/1996 | Connell et al. | 363/60 |
| 5,532,916 | 7/1996 | Tamagawa | 363/62 |
| 5,606,491 | 2/1997 | Ellis | 363/60 |
| 5,635,776 | 6/1997 | Imi | 307/110 |
| 5,642,073 | 6/1997 | Manning | 327/536 |
| 5,668,710 | 9/1997 | Caliboso et al. | 363/60 |

OTHER PUBLICATIONS

Wireless Systems Design/Apr. 1996, GaAs MESFETs Are Expected to Make Big Gains in Portable Communications Applications. By Robert Bayruns, John Van Saders, Jennifer Palella and Shihab Al–Kuran, pp. 39–42.

Anadigics, Inc. Dec. 17, 1996, Your GaAs IC Source, AVC7660S9C, Switched Capacitor Voltage Converter Advanced Product Information, p. 1 and p. 5.

*Primary Examiner*—Peter S. Wong
*Assistant Examiner*—Rajnikant B. Patel

[57] ABSTRACT

This invention provides a voltage inverting charge pump 20. The charge pump 20 produces an output at node 60 which is twice the magnitude of the inverse of the input voltage applied to node 50. A first set of switches 22, 24, 26, 28 are connected to the pair of pump capacitors 36, 38 and a voltage supply input so as to connect the pump capacitors 36, 38 and the voltage supply input in parallel when the first set of switches 22, 24, 26, 28 is closed. A second set of switches 30, 32, 34 is connected to the pump capacitors 36, 38, a hold capacitor 40, and an output terminal 60 so as to connect the charged pump capacitors 36, 38 in series with the output terminal 60 and in parallel with the hold capacitor 40 when the second set of switches 30, 32, 34 is closed.

15 Claims, 3 Drawing Sheets

INVERTING CHARGE PUMP

FIELD OF THE INVENTION

This invention is related to a DC to DC Converter and more particularly to a charge pump for generating an output voltage which is the inverse of an integer multiple of the input voltage.

BACKGROUND OF THE INVENTION

Discrete component voltage doubler and voltage inverter circuits are well known in the art. Such circuits are used in many electronic systems which require a multiplicity of DC voltages for operation. Hand held portable communication devices are one such example. These devices typically utilize several DC voltages for operation and are developing to utilize lower battery voltages in order to reduce the size and weight of the device. For example, the use of a lithium ion battery is expected to reduce the overall size of these portable devices and produce a battery voltage of approximately 3.5 Volts. In addition, the digital circuitry running from lower operating voltages results in a reduction in power dissipation. Voltage multiplying and inverting charge pumps circuit have been developed for increasing the lower battery supply voltages in order to maintain both efficiency and output power in the power amplifiers utilized in these devices.

An example of known inverting charge pump is shown in FIG. 1. This design is known in the art as a H-bridge circuit. This circuit utilizes four switches 4,6,8,10, a pump capacitor 12, and a hold capacitor 14 to generate an output voltage, −V, from an input voltage, +V. The switches are controlled by non-overlapping differential square wave signals, Q and Q'. When the signal Q is high Q' is low, the upper two switches 4,6 are closed and the lower two switches 8,10 are open. This defines a charge cycle. During the charge cycle the pump capacitor 12 is charged to the power supply voltage, +V. When the differential control signals switch Q goes low and Q' goes high, the upper two switches 4,6 open and the lower two switches 8,10 close, resulting in a charge transfer cycle. During the charge transfer cycle the pump capacitor 12 is charged to the power supply voltage +V. A portion of the charge on the pump capacitor 12 is transferred to the hold capacitor 14 and a small negative voltage develops across the hold capacitor. The amount of charge transferred in each charge transfer cycle is governed by the $R_{on}C_p$ time constant where $R_{on}$ is the on resistance of the switches and $C_p$ is the capacitance of the pump capacitor 12. As the process continues through several charge and charge transfer cycles, more charge is transferred from the pump capacitor 12 to the hold capacitor 14 until the voltage across the hold capacitor 14 reaches a steady state voltage of negative V. While this circuit provides an inverted output, it does not provide a voltage which is greater in magnitude that the input voltage.

An example of a voltage multiplying and inverting charge pump is shown in U.S. Pat. No. 4,807,104 by Floyd et al. That patent teaches a charge pump circuit for outputting either a positive or a negative output voltage having a predetermined magnitude which is an integral multiple of the magnitude of power supply voltage. The first capacitor is charged to the power supply voltage. The first capacitor is coupled to the power supply voltage to develop a double voltage transfer supply with the supply voltage. Second and third capacitors are charged by the double voltage transfer supply. The second capacitor is used to store the charge from the first capacitor for a continuous output voltage having a magnitude which is twice the magnitude of the power supply. The third capacitor may be reconfigured to generate a negative transfer voltage.

The negative transfer voltage is used to charge a fourth capacitor which provides a negative output voltage with twice the magnitude of the power supply voltage.

For applications requiring only an inverted output voltage which is twice the magnitude of the power supply voltage, a problem exists in that the circuit of figure one does not give a multiple of the input voltage and excess power is dissipated through components placed in the Floyd et al. circuit to achieve various outputs (ie. $^+$ZV). Also each additional component requires additional space on the device. It is therefore desirable to reduce the number of components necessary for implementing such a circuit.

SUMMARY

The object of the invention is to provide a charge pump which minimizes the number of components and thus minimizes both the space and power necessary for implementing such a circuit.

This and other objects have been achieved by providing a charge pump circuit having a hold capacitor, a pair of pump capacitors, and two sets of switches. The first set of switches are connected to the pair of pump capacitors and a voltage supply input so as to connect the pump capacitors and the voltage supply input in parallel when the first set of switches are closed. The second set of switches are connected to the pump capacitors, the hold capacitor, and an output terminal so as to connect the charged pump capacitors in series with the output terminal and in parallel with the hold capacitor when the second set of switches is closed.

BRIEF DESCRIPTION OF THE DRAWINGS

The invention will now be described by way of example with reference to the accompanying figures in which.

DETAILED DESCRIPTION OF THE EMBODIMENT

Figure 1:
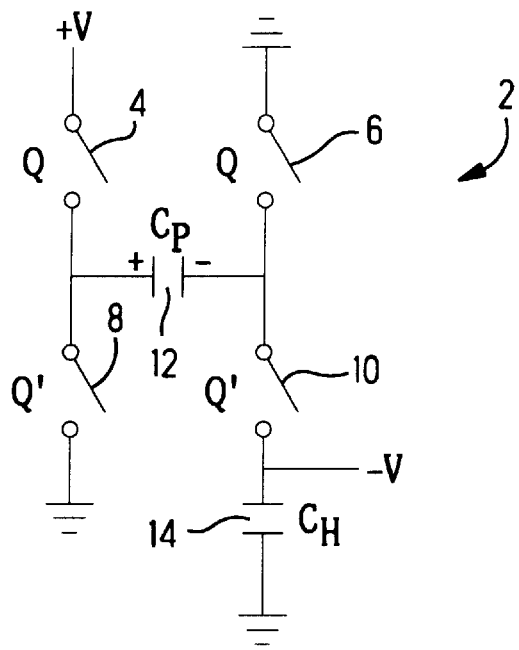
FIG. 1 shows a schematic of a prior art voltage inverter.
Figure 2:
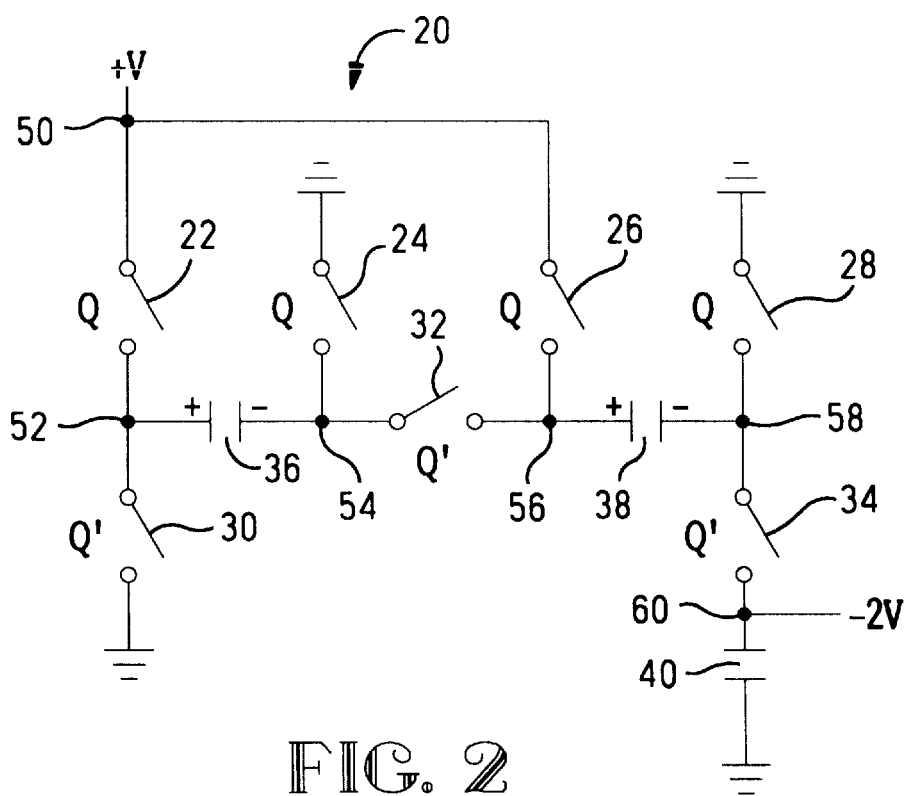
FIG. 2 shows a schematic of an inverting charge pump according to the present invention.

FIG. 2 shows an inverting charge pump, 20 according to the present invention. The inverting charge pump 20 consists of a first set of switches 22, 24, 26, 28, a pair of pump capacitors 36,38, a hold capacitor 40, and a second pair of switches 30, 32, 34.

It should be understood that each of the switches has a control terminal which is not shown in FIG. 2 but will be described below.

The circuit will now be described in greater detail again with reference to FIG. 2. A first terminal of switch 22 is connected to a voltage supply +V at node 50. A second terminal of switch 22 is connected to a first terminal of switch 30 at node 52. A second terminal of switch 30 is connected to a ground reference. Pump capacitor 36 has a first terminal connected to node 52 between switches 22 and 30. A second terminal of pump capacitor 36 is connected to node 54. Switch 24 has a first terminal connected to node 54 and a second terminal connected to the ground reference. A first terminal of switch 32 is connected to node 54 and a second terminal of switch 32 is connected to node 56. A first terminal of switch 26 is connected to the voltage supply, V at node 50 and a second terminal of this switch 26 is connected to node 56. Pump capacitor 38 has a first terminal connected to node 56 and a second terminal connected to node 58. Also connected to node 58 is a first terminal of switch 28. A second terminal of switch 28 is connected to the ground reference. A first terminal of switch 34 is connected to node 58 and a second terminal of switch 34 is connected to output node 60. A hold capacitor 40 is connected between output node 60 and the ground reference.

Two control signals are required to operate the circuit shown in FIG. 2. These Control signals are represented by Q and Q' in FIG. 2. Q and Q' are non overlapping differential signals. Therefore if Q' is in a low state then Q will be in a high state and vice versa.

Figure 3:
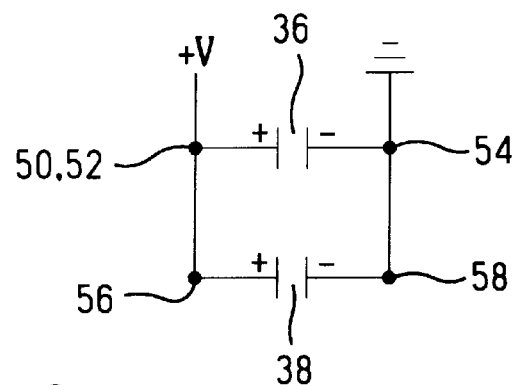
FIG. 3 shows a schematic of an equivalent circuit during a charge cycle.
Figure 4:
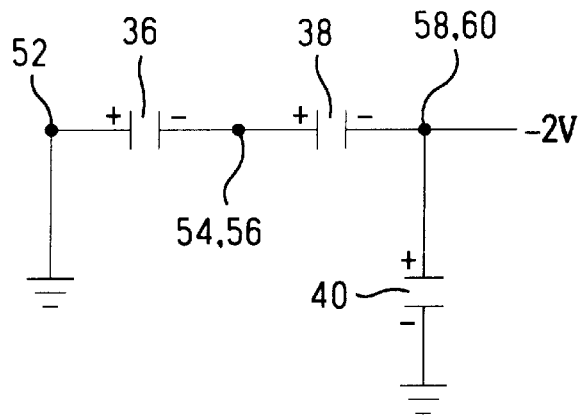
FIG. 4 shows a schematic of an equivalent circuit during a charge transfer cycle.

During a charging cycle the switches 22, 24,26,28 are controlled by the signal Q such that they are all closed while each of the switches 30, 32, 34 controlled by Q' are open. This results in the equivalent circuit shown in FIG. 3 wherein pump capacitor 36 is connected between nodes 52 and 54, and pump capacitor 38 is connected in parallel at nodes 56 and 58. The two pump capacitors 36,38 are charged to the power supply voltage $_+$V. The control signals then transition to opposite states to begin a charge transfer cycle. During the charge transfer cycle switches 22,24,26,28 open while switches 30, 32, 34 close (FIG. 2)resulting in the equivalent circuit shown in FIG. 4. In the charge transfer cycle, pump capacitor 36 is connected in series with pump capacitor 38 between nodes 52 and 58. The hold capacitor 40 is connected in parallel with the pump capacitors 36, 38 at node 58. Node 58 is also collapsed with output node 60 and connected to the output $_{-2}$V. In this cycle, the pump capacitors 36,38 transfer a portion of their charge to the hold capacitor 40. At start up, this transfer of charge continues through several charge and charge transfer cycles until the voltage across the hold capacitor 40 equals twice the voltage on the input node 50. The time constant that controls the length of time required to develop −2V on the hold capacitor 40 is $R_{out} C_H$ where $R_{out}$ is the output impedance of this circuit and $C_H$ is the capacitance of the hold capacitor 40. It can be shown that the output impedance of this circuit is $2fC_H$. Where f equals 1 over the period of the Q and Q' signals.

Figure 5:
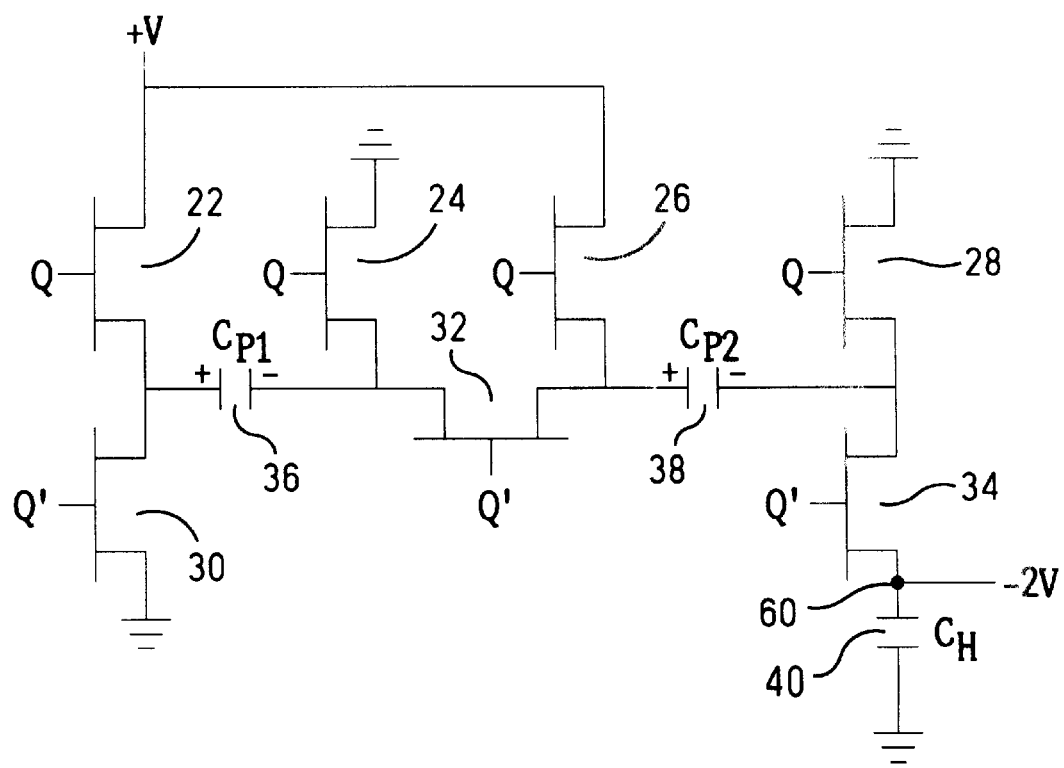
FIG. 5 shows an implementation of the schematic of FIG. 2.

FIG. 5 shows an implementation of the inverting charge pump 20 of FIG. 2. Here it can be seen that each of the switches 23,24,26,28,30,32,34 is implemented using a field effect transistor each having a control terminal connected to the appropriate control signal "Q, Q'". It is preferred to use GaAs MESFET devices for the switches. However, other suitable transistor devices may be utilized to implement this circuit such as Si MOSFETs or Si BJTs.

Figure 6:
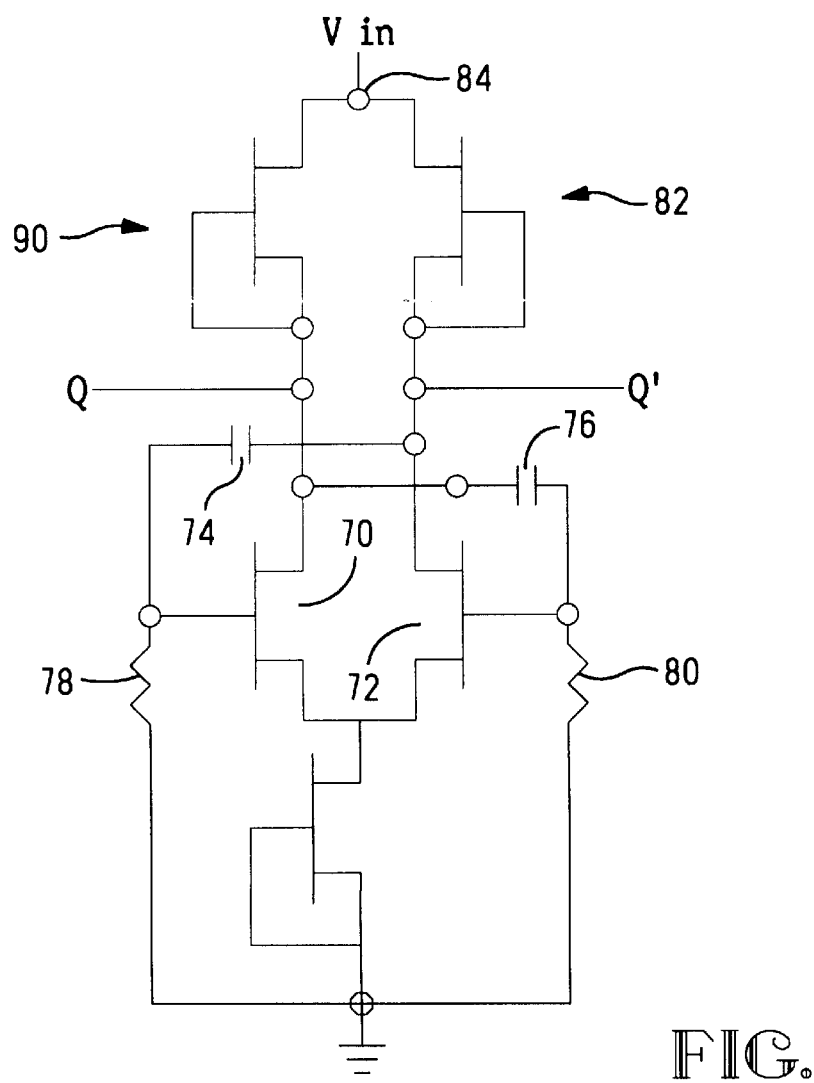
FIG. 6 shows a schematic of a multivibrator oscillator circuit.

A Multivibrator oscillator 90 is utilized for generating the switch control signals Q and Q'. An example of such a multivibrator 90 is shown in FIG. 6.

It can be seen that this circuit utilizes a differential pair of field effect transistors FETs 70,72 with active loads and a current source 82. Capacitors 74,76 which are cross coupled from the gate of one device to the drain of the other device causes the oscillation to occur. The oscillation frequency is controlled by the time constant of the cross coupled capacitor and a resistor 78,80 connected from the gate of the differential pair to ground. The differential outputs Q and Q' of the multivibrator are taken from the drain terminals of the differential pair 70,72. The output −2V (node 60) of the inverting charge pump 20 (FIG. 5) is connected to the gate source connection 84 of the current source 82 in the oscillator 90. This allows the output voltage of the multivibrator oscillator 90 to swing from $_{-2}$V to +V.

The advantage of the present invention is that it provides an inverted output voltage $_{-2}$V which is approximately twice the input voltage $_{+2}$V using an implementation which has fewer components and lower power dissipation than known circuits performing similar functions.

We claim:

1. A voltage inverting charge pump comprising:

a pair of pump capacitors;

a hold capacitor;

a first group of switches connected to an input terminal, a reference terminal, and both pump capacitors such that the pump capacitors are connected in parallel with each other between the input terminal and the reference terminal when the first group of switches is closed; and, a second group of switches connected to the pair of pump capacitors, the hold capacitor and an output terminal such that the pair of pump capacitors are connected in series with each other between an output terminal and the reference terminal; and the hold capacitor is connected in parallel with the pump capacitors when the second group of switches is closed.

2. The voltage inverting charge pump as recited in claim 1 wherein the first group of switches are transistors.

3. The voltage inverting charge pump as recited in claim 2 wherein the first group of switches is controlled by a control signal, Q.

4. The voltage inverting charge pump as recited in claim 1 wherein the second group of switches are transistors.

5. The voltage inverting charge pump as recited in claim 4 wherein the second group of switches is controlled by a control signal, Q'.

6. The voltage inverting charge pump as recited in claim 1 wherein the first group of switches comprise transistors each controlled by a control signal, Q and the second group of switches comprise transistors each controlled a control signal Q'.

7. The voltage inverting charge pump as recited in claim 6 wherein Q and Q' are non-overlapping differential square wave signals.

8. A charge pump comprising:

a pair of pump capacitors connected between an input terminal and an output terminal each pump capacitor having first and second terminals;

a first group of switches being controllable by a first control signal, two of the first group of switches being connected between the input terminal and the first terminal of each pump capacitor, and another two of the first group of switches being connected between the second terminal of each pump capacitor a reference terminal; and, a second group of switches being controllable by a second control signal, one of the second group of switches being connected between the first terminal of one pump capacitor and the reference terminal, a second one of the second group of switches being connected between the second terminal of one pump capacitor and the first terminal of the other pump capacitor, and a third one of the second group, of switches being connected between the second terminal of the other pump capacitor and the output terminal.

9. The charge pump as recited in claim 8 further comprising a hold capacitor being connected between the output terminal and the reference terminal.

10. The charge pump as recited in claim 8 wherein a voltage on the output terminal is approximately twice the magnitude as a voltage applied to the input terminal.

11. The charge pump as recited in claim 9 wherein a voltage on the output terminal is the inverse of approximately twice a voltage applied to the input terminal.

12. The charge pump as recited in claim 8 wherein the first and second control signals comprise non-overlapping differential square waves.

13. A method of producing an output voltage, −2V from an input voltage, V, wherein the output voltage is approximately twice a magnitude of an inverse of the input voltage the method comprising the steps of:

connecting the input voltage, V to two pump capacitors, each pump capacitor being connected in parallel;

charging the pump capacitors to the input voltage, V;

reconnecting the pump capacitors in series with each other and connecting a hold capacitor in parallel with the reconnected series pump capacitors; and, connecting an output terminal between the hold capacitor and the pump capacitors.

14. The method as recited in claim 13 wherein the input voltage is connected to the pump capacitors by closing a first plurality of transistor switches.

15. The method as recited in claim 13 wherein the pump capacitors are reconnected in series by opening the first plurality of transistor switches and closing a second plurality of transistor switches.

* * * * *